United States Patent
Atilla (10) Patent No.: US 12,349,830 B2
(45) Date of Patent: Jul. 8, 2025

(54) HOT BEVERAGE PREPARING DEVICE

(71) Applicant: ARZUM ELEKTRIKLI EV ALETLERI SAN. VE TIC. A.S., Istanbul (TR)

(72) Inventor: Ersoy Atilla, Istanbul (TR)

(73) Assignee: ARZUM ELEKTRIKLI EV ALETLERI SAN. VE TIC. A.S., Istanbul (TR)

( * ) Notice: Subject to any disclaimer, the term of this patent is extended or adjusted under 35 U.S.C. 154(b) by 734 days.

(21) Appl. No.: 17/773,062

(22) PCT Filed: Oct. 29, 2020

(86) PCT No.: PCT/TR2020/051018
§ 371 (c)(1),
(2) Date: Apr. 29, 2022

(87) PCT Pub. No.: WO2021/086297
PCT Pub. Date: May 6, 2021

(65) Prior Publication Data
US 2023/0255393 A1 Aug. 17, 2023

(30) Foreign Application Priority Data
Oct. 30, 2019 (TR) .................. 2019/16761

(51) Int. Cl.
*A47J 31/40* (2006.01)
*A47J 31/18* (2006.01)
*A47J 31/36* (2006.01)

(52) U.S. Cl.
CPC ............. *A47J 31/405* (2013.01); *A47J 31/18* (2013.01); *A47J 31/3614* (2013.01)

(58) Field of Classification Search
CPC ................ A47J 31/3604; A47J 31/3614; A47J 31/3633; A47J 31/405
See application file for complete search history.

(56) References Cited

U.S. PATENT DOCUMENTS

| 4,572,060 | A | | 2/1986 | Yung-Kuan |
| 5,964,142 | A | * | 10/1999 | Tio ...................... A47J 31/3614 99/289 R |
| 6,988,444 | B1 | * | 1/2006 | Pfeifer .................... A47J 31/42 99/290 |
| 9,186,019 | B2 | | 11/2015 | Masciandaro et al. |
| 2007/0012196 | A1 | | 1/2007 | Sato |

(Continued)

FOREIGN PATENT DOCUMENTS

| EP | 2033550 | A2 | | 3/2009 | |
| EP | 3053490 | A1 | * | 8/2016 | .......... A47J 31/0647 |

(Continued)

Primary Examiner — John J Norton
(74) Attorney, Agent, or Firm — Bayramoglu Law Offices LLC (57) ABSTRACT

A hot beverage preparing device for preparing hot beverages without a need for a user intervention, wherein materials to be used are prevented from being affected by a water vapor formed during a brewing process, or by a residual water inside a brewing chamber. The hot beverage preparing device comprising at least one inlet opening for taking at least one material required for preparing a hot beverage inside of the brewing chamber.

7 Claims, 6 Drawing Sheets

(56) References Cited

U.S. PATENT DOCUMENTS

| | | | |
|---|---|---|---|
| 2010/0064897 A1* | 3/2010 | Trio | A47J 31/3614 |
| | | | 99/289 R |
| 2010/0186598 A1* | 7/2010 | De' Longhi | A47J 31/467 |
| | | | 99/289 R |
| 2014/0360379 A1 | 12/2014 | Radhakrishnan et al. | |
| 2014/0373724 A1* | 12/2014 | De'Longhi | A47J 31/3619 |
| | | | 99/289 R |
| 2015/0223629 A1* | 8/2015 | Marchi | A47J 31/405 |
| | | | 99/287 |
| 2021/0330116 A1* | 10/2021 | De'Longhi | A47J 31/3638 |

FOREIGN PATENT DOCUMENTS

| | | | |
|---|---|---|---|
| TR | 201214653 | 8/2013 | |
| WO | WO-03043471 A1 * | 5/2003 | A47J 31/3614 |

\* cited by examiner

HOT BEVERAGE PREPARING DEVICE

CROSS REFERENCE TO THE RELAYED APPLICATIONS

This application is the national stage entry of International Application No. PCT/TR2020/051018, filed on Oct. 29, 2020, which is based upon and claims priority to Turkish Patent Application No. 2019/16761 filed on Oct. 30, 2019, the entire contents of which are incorporated herein by reference.

TECHNICAL FIELD

The present invention relates to a hot beverage preparing device for preparing hot beverages, especially Turkish coffee.

BACKGROUND

Hot beverage preparing machines are used for preparing hot beverages such as Turkish coffee. The present Turkish coffee machines might brew Turkish coffee after the user adds the required materials inside a brewing chamber. In some other Turkish coffee machines, the user adds only the coffee and sugar inside the brewing chamber, and the required water might automatically be received form a water tank. Afterwards, the user serves the coffee into cups. In another Turkish coffee machine, after the user adds the coffee and sugar into the brewing chamber, the said Turkish coffee machine receives water from the tank, transfers the water inside the brewing chamber, stirs the materials inside the brewing chamber, and once the coffee is ready, automatically serves it into cups.

However, the hot beverage preparing devices in the state of the art, and especially the Turkish coffee machines, requires the materials to be added into the brewing chamber by the user.

In the Turkish patent document numbered 2012/14653 in the background of the invention, a Turkish coffee machine for brewing and serving Turkish coffee, is disclosed. Even though the said Turkish coffee machine might brew and serve the coffee, it requires the materials to be used to be added into the brewing chamber by the user.

In the United States patent document numbered U.S. Pat. No. 4,572,060A in the background of the invention, a coffee machine having an automatic feeder, is disclosed. In front of the coffee feeding unit of the said coffee machine, an electromagnetic valve is located. The valve is opened only when coffee is to be fed, and at other times, it is closed. By this, the coffee is prevented from getting humidified.

In the United States patent document numbered U.S. Pat. No. 9,186,019 in the background of the invention, a coffee machine having an infusion unit, is disclosed. The base of the infusion unit is movable. However, the coffee powder is fed to the coffee machine through a hopper which is above the said base. Therefore, the materials to be used cannot prevented from being affected by the water vapor formed during the brewing process, or by the residual water inside the brewing chamber.

In the state of the art, a hot beverage preparing device wherein the materials to be used are prevented from being affected by the water vapor formed during the brewing process, or by the residual water inside the brewing chamber, is not disclosed. However, such a hot beverage preparing device wherein the materials to be used are prevented from being affected by the water vapor formed during the brewing process, or by the residual water inside the brewing chamber, is needed.

SUMMARY

An object of the invention is to provide a hot beverage preparing device wherein the materials to be used are prevented from being affected by the water vapor formed during the brewing process, or by the residual water inside the brewing chamber.

Another object of the invention is to provide a hot beverage preparing device that can prepare hot beverages without the need for user intervention.

BRIEF DESCRIPTION OF THE DRAWINGS

The hot beverage preparing device in order to fulfill the objects of the present invention is illustrated in the attached figures, where.

Elements shown in the figures are individually numbered, and the correspondence of these numbers are given as follows:
1. Hot beverage preparing device
2. Brewing chamber
   21. Base
3. Discharge opening
4. Inlet opening
E. Axial line
N. Normal to the ground plane

DETAILED DESCRIPTION OF THE EMBODIMENTS

The hot beverage preparing device (1) wherein the materials to be used are prevented from being affected by the water vapor formed during the brewing process, or by the residual water inside the brewing chamber essentially comprises;
  at least one brewing chamber (2) which is suitable for the materials required for preparing a hot beverage to be put inside, having at least one base (21) movable in upwards and downwards directions,
  at least one discharge opening (3) for discharging the materials from inside the brewing chamber (2), providing a passage between the inside and the outside of the brewing chamber (2), and
  at least one inlet opening (4) for taking at least one material required for preparing the beverage inside of the brewing chamber (2).

Figure 5:
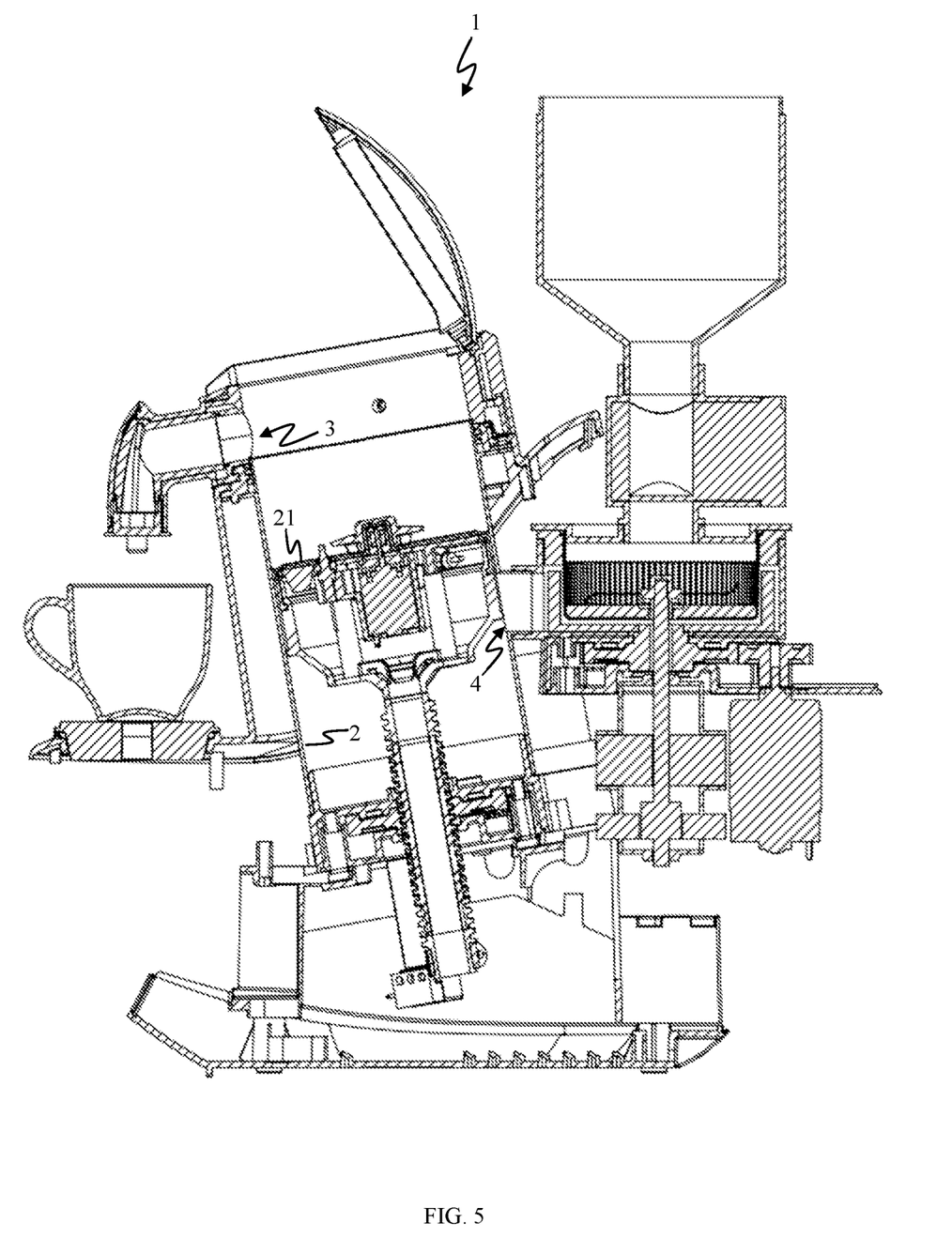
FIG. 5: Cross-sectional view of the inventive hot beverage preparing device in its brewing position.
Figure 6:
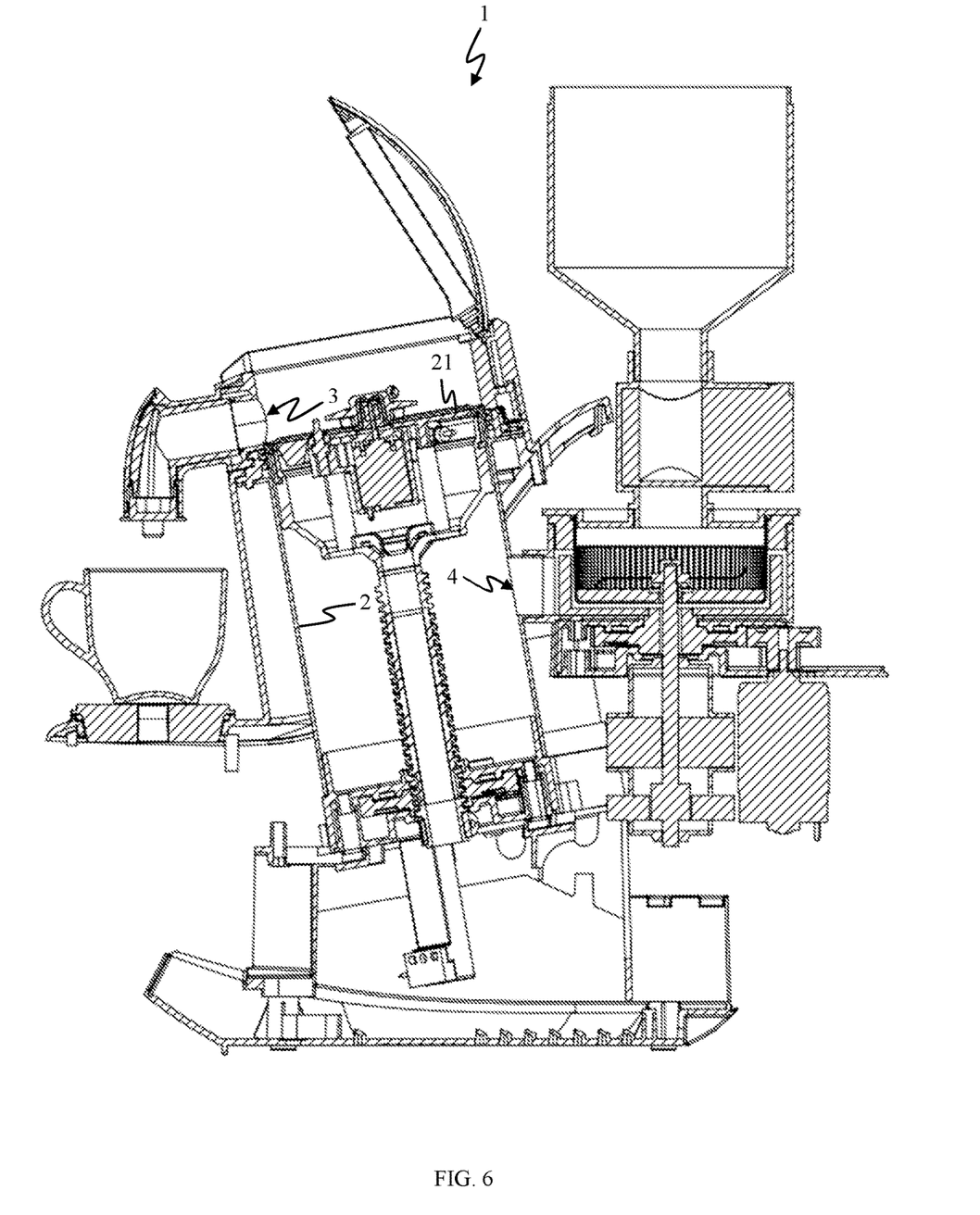
FIG. 6: Cross-sectional view of the inventive hot beverage preparing device in its discharge position.

The hot beverage preparing device (1) wherein the materials to be used are prevented from being affected by the water vapor formed during the brewing process, or by the residual water inside the brewing chamber (2) comprises at least one brewing chamber (2) which is suitable for the materials required for preparing a hot beverage to be put inside, having at least one base (21) movable in upwards and downwards directions. Said base (21) has, at least, one intake position which is suitable for the materials to be taken inside the brewing chamber (2) (FIG. 4), at least one brewing position which is suitable for carrying out the brewing process (FIG. 5), and at least one discharge position which is suitable for the brewed beverage to be discharged (FIG. 6). Said base (21) is movable between the said positions.

Figure 4:
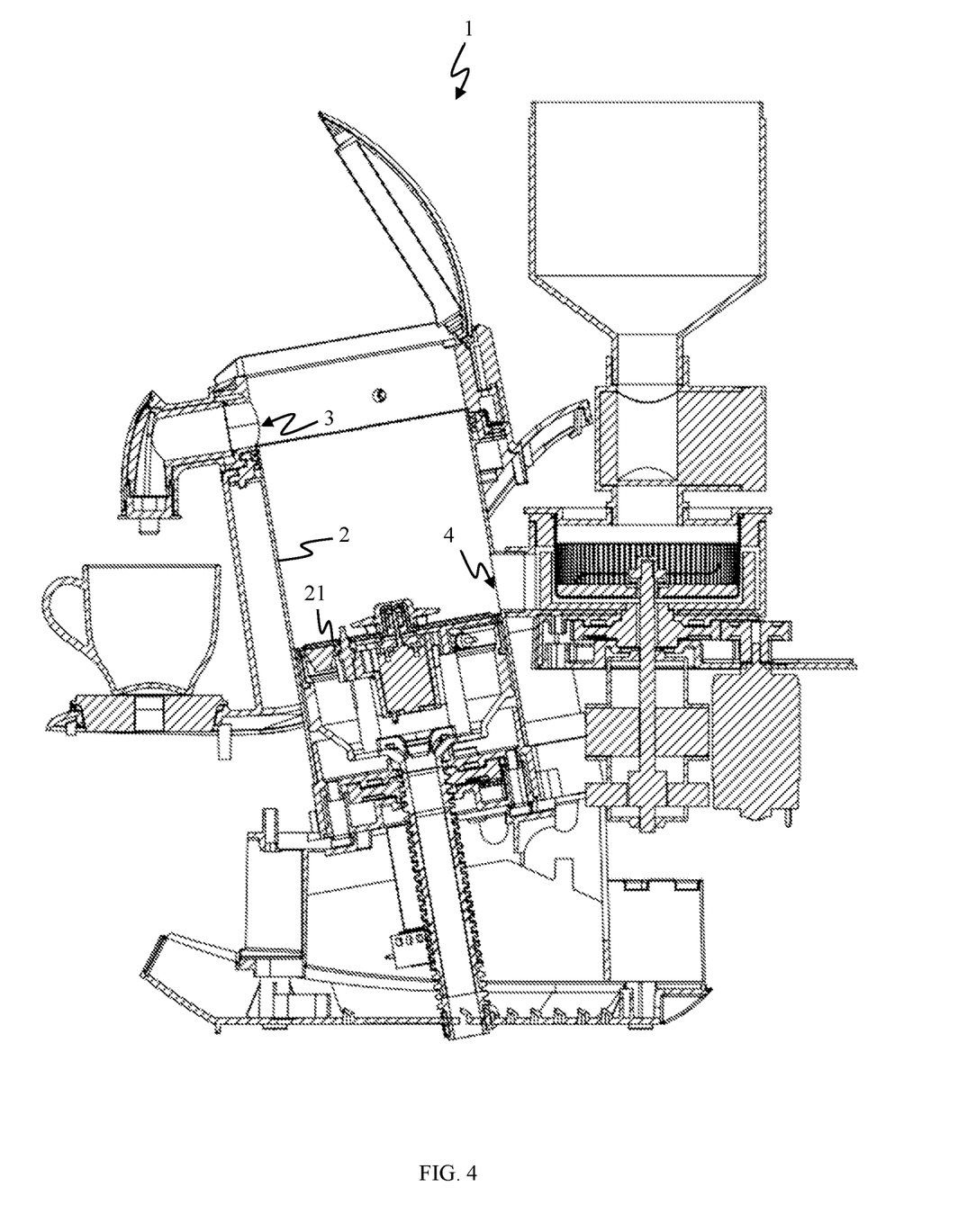
FIG. 4: Cross-sectional view of the inventive hot beverage preparing device in its intake position.

In the inventive hot beverage preparing device (1), the discharge opening (3) is located on the upper region of the brewing chamber (2). In the brewing position, the base (21) has a distance from the discharge opening (3) such that the materials inside the brewing chamber may not reach the discharge opening (3). The discharge opening (3) might be located on the brewing chamber (2) as well as on a separate part suitable for placing over the said brewing chamber (2) (FIGS. 4, 5 and 6).

When the brewing process is completed and/or the materials inside the brewing chamber (2) are wanted to be discharged, the base (21) moves towards the discharge opening (3), and thus, the materials inside the brewing chamber are discharged to the outside of the brewing chamber (2) from the inside of the brewing chamber (2) via the discharge opening (3).

In the inventive hot beverage preparing device (1), the inlet opening (4) is located on the lower region of the brewing chamber (2). When materials are wanted to be taken inside the brewing chamber (2), the base (21) is moved such that it is located below the inlet opening (4). By this, the said inlet opening (4) is only reachable when the materials are to be taken inside the brewing chamber (2).

When the base (21) reaches a location below the inlet opening (4), that is the intake position, the materials are taken inside the brewing chamber (2) via the inlet opening (4). In the inventive hot beverage preparing device (1), the brewing chamber (2) might comprise more than one inlet openings (4). By this, different materials such as sugar, coffee, whitener etc. might be taken inside the brewing chamber (2) via different inlet openings (4). In the inventive hot beverage preparing device (1), different materials might also be taken inside the brewing chamber (2) via the same inlet opening (4). Clearly, it is also possible to receive one type of material through different inlet openings (4).

Said materials might be forced to exit to the brewing chamber (2) by a driving means, as well as falling inside the brewing chamber (2) under the effect of gravity. The inlet opening (4) is preferably located opposite to the discharge opening (3). In the brewing position, the base is located in a position higher than the inlet opening (4). By this, the vapor formed during the brewing process does not contact the inlet opening (4), and by the virtue of this, the humidification of the inlet opening (4), and thus, the affection of the materials is prevented.

In an embodiment of the invention, usable with the other embodiments, the brewing chamber (2) and/or the base (21) is sloped with respect to the ground plane such that it guides the materials inside the brewing chamber (2) towards the side having the discharge opening (3). By the virtue of this slope, the materials that may have remained inside the brewing chamber (2) move such that they diverge from the inlet opening (4). By this, when the base (21) moves to the intake position for receiving materials, the liquids that may have remained inside the brewing chamber (2) do not contact the inlet opening (4), and by the virtue of this, the humidification of the inlet opening (4), and thus, the affection of the materials is prevented.

Figure 1:
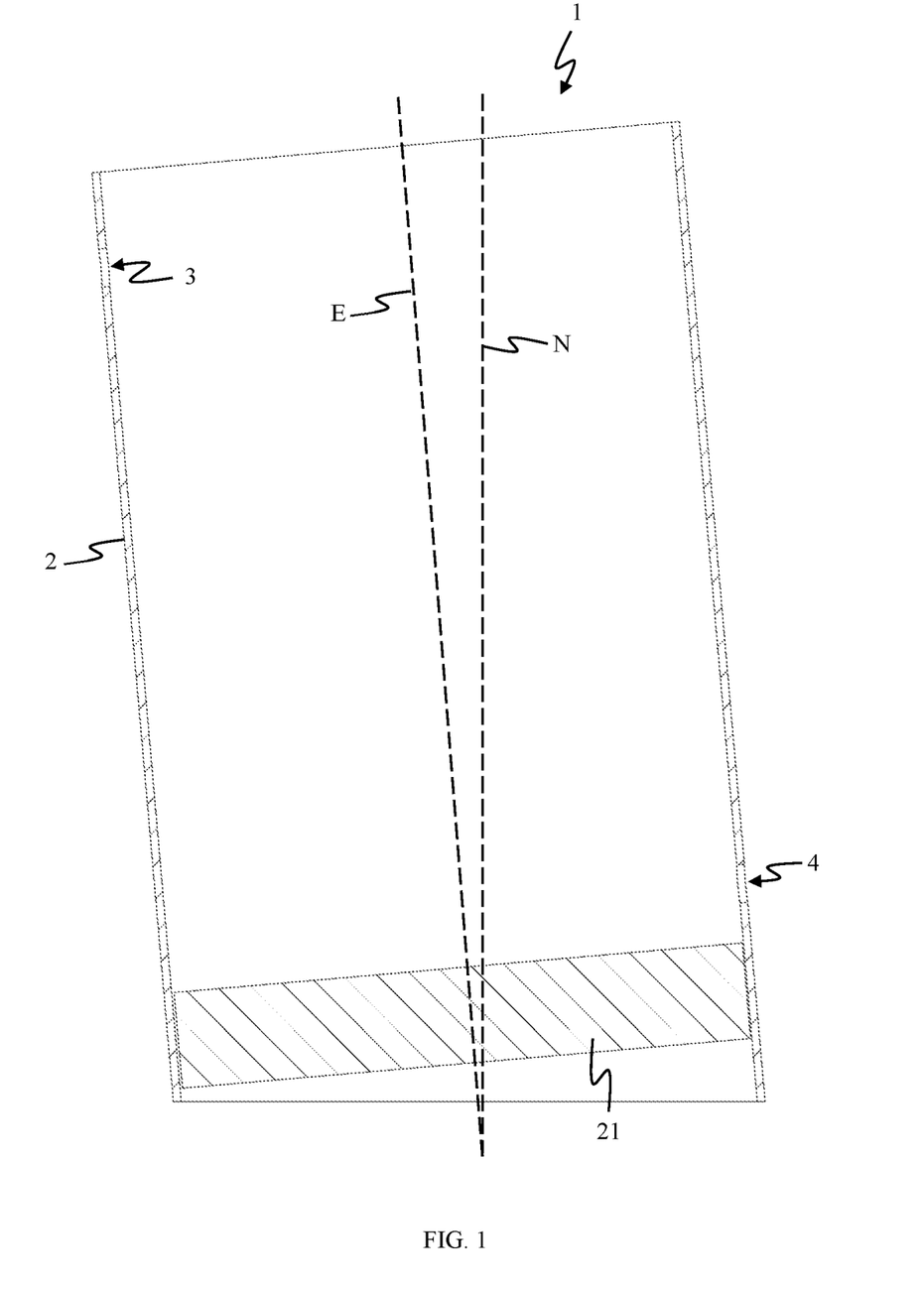
FIG. 1: Cross-sectional view of an embodiment wherein the brewing chamber is sloped.

In an embodiment of the invention, usable with the other embodiments, the brewing chamber (2) rises in a sloped manner with respect to the ground plane (FIG. 1). To clarify, it might be assumed that the center of the brewing chamber (2) is on a line (axial line (E)). In this embodiment, the axial line (E) and the normal to the ground plane (N) have an angle between them. In this embodiment, the normal to the base (21) might be parallel to the said axial line (E), or it might have an angle with respect to the said axial line (E).

Figure 2:
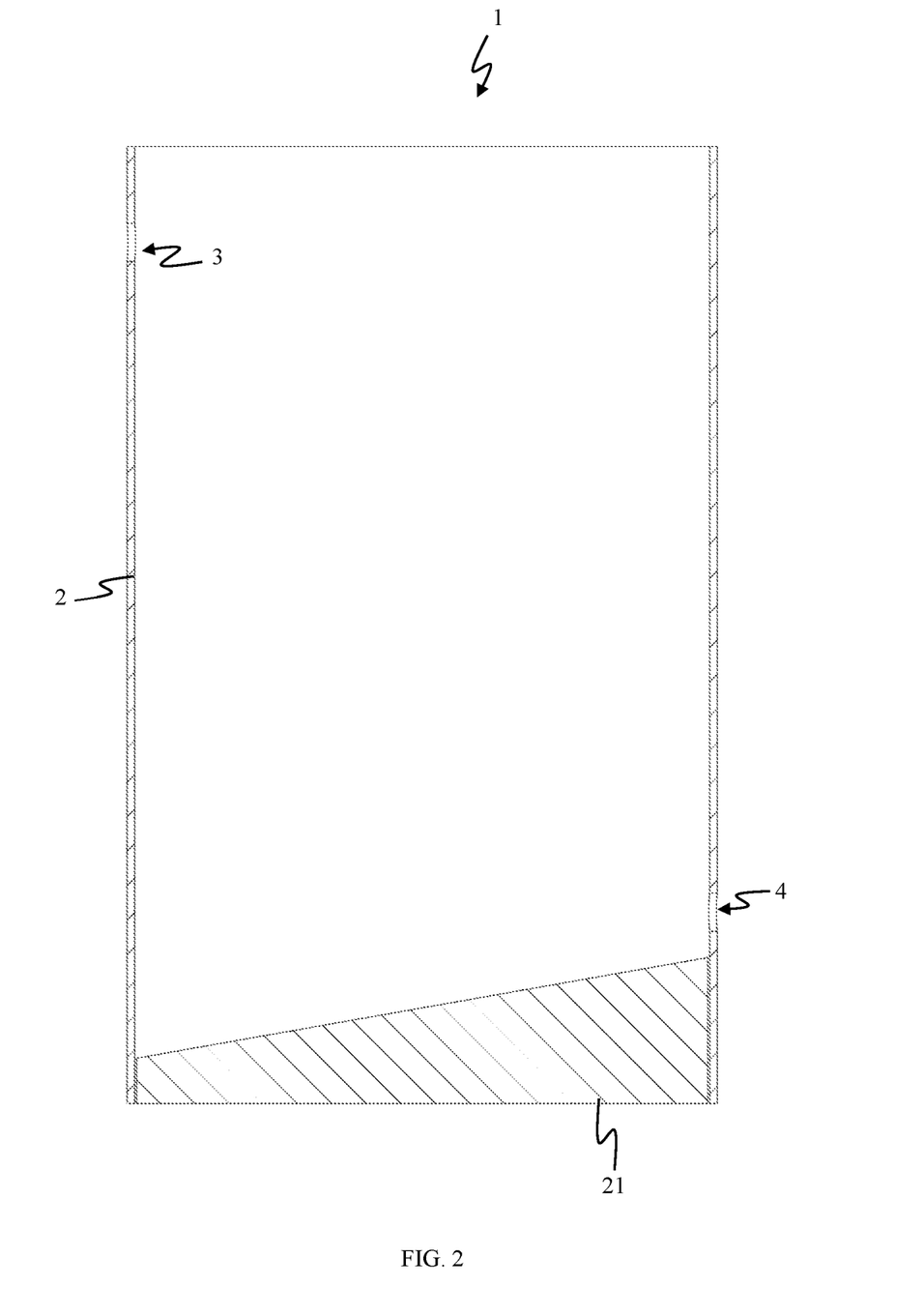
FIG. 2: Cross-sectional view of an embodiment wherein one part of the base is thicker than its other part.
Figure 3:
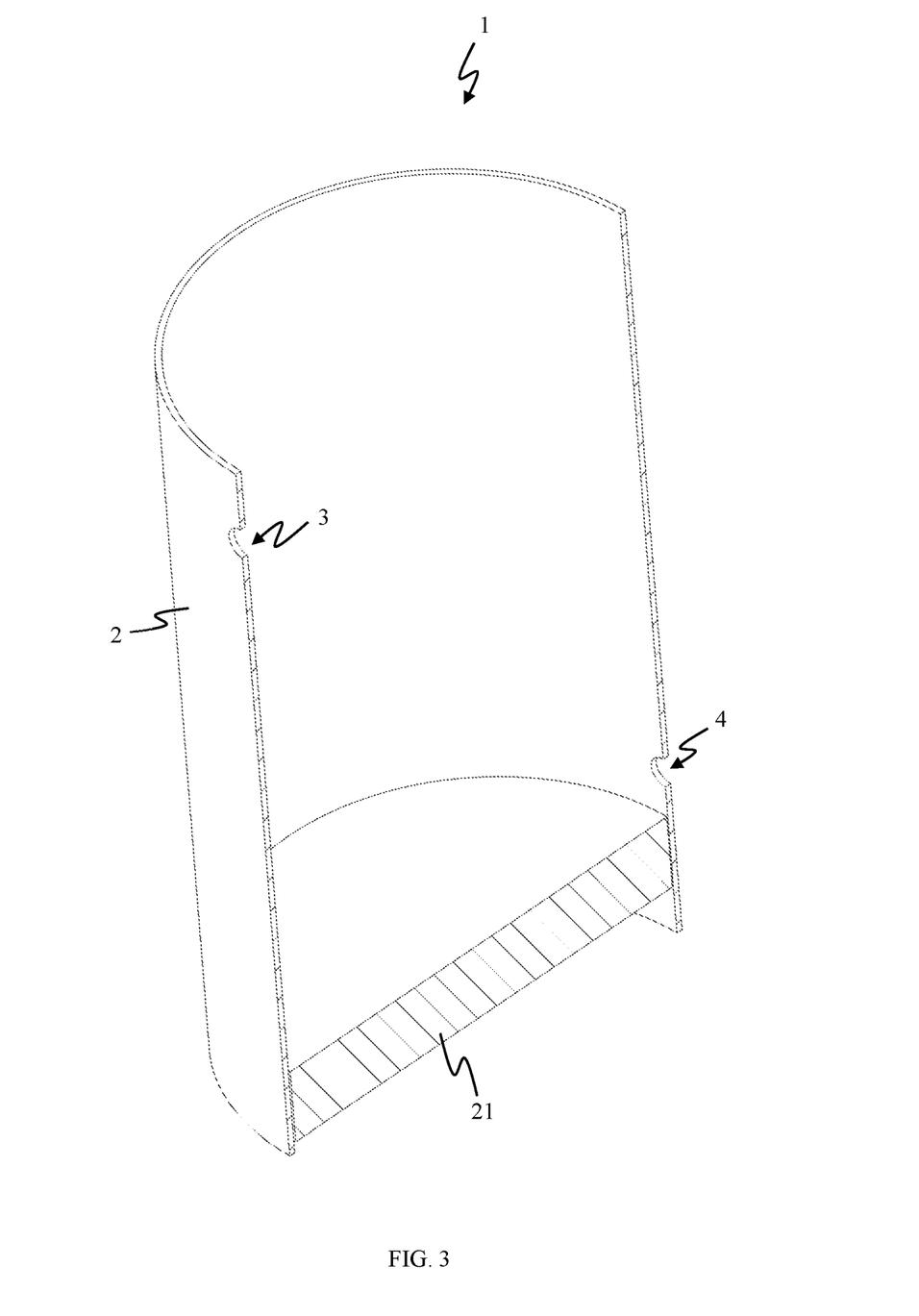
FIG. 3: Isometric cross-sectional view of an embodiment wherein the brewing chamber is sloped.

In an embodiment of the invention, usable with the other embodiments, the brewing chamber (2) rises in a manner parallel to the ground plane (FIG. 2). To clarify, it might be assumed that the center of the brewing chamber (2) is on a line (axial line (E)). In this embodiment, the axial line (E) is parallel to the normal to the ground plane (N). In this embodiment, the normal to the base (21) has an angle with respect to the said axial line (E). The slope of the base (21) might be enabled by placing the base (21) in a sloped manner and/or the base (21) being thicker in the part that is closer to the inlet opening (4) than its parts that are closer to the discharge opening (3) and/or the base (21) having a sloped heater (not shown) and/or the said heater being thicker in the part that is closer to the inlet opening (3) than its parts that are closer to the discharge opening (3), however it is not limited to these examples.

The base (21) might be moved by any means that are known in the state of the art, such as a piston and/or a threaded shaft etc. or any means that might be developed in the future.

In the preferred embodiment of the invention by means of the inlet opening (4), materials in powder form or granular form might be taken. The materials in liquid form are taken inside the brewing chamber (2) preferably by means of another opening that is located on the upper part of the brewing chamber (2) or over the brewing chamber (2).

The materials taken inside the brewing chamber (2) via the inlet opening (4) might be taken from a separate chamber and/or a separate component such as a grinder, however it is not limited to these examples.

Even though the discharge opening (3) and the inlet opening (4) are shown having a circular cross-section in the figures, they might have any cross-sectional shape. Additionally, a guide, such as a channel, might be connected to the said discharge opening (3) and/or the inlet opening (4) for the transfer of the materials. Said guide, for example, may be a discharge outlet for pouring the liquid discharged via the discharge opening (3) into another container, extending away from the brewing chamber (2) in horizontal direction, and then extending in the vertical direction, however it is not limited to this example.

The preferred use for the inventive hot beverage preparing device (1) is as follows: The brewing position of the base (21) is, preferably, also the idle position. When the user starts the brewing process, the base (21) moves to the intake position. When the base (21) reaches the intake position, the required materials are taken inside the brewing chamber (2) via the inlet opening (4). Afterwards, the base (21) raises to the brewing position. The liquids such as water etc. needed for brewing the materials are taken into the brewing chamber (2) in this stage and the brewing process is started. In the meantime, it is possible to stir the materials inside the brewing chamber (2) by means of a stirrer. Once the brewing process is completed, the base (21) moves towards the discharge opening (3). By this, the materials inside the chamber (2) are poured to an external cup through the discharge opening (3). By this, the inventive hot beverage preparing device (1) automatically prepares hot beverages without the need for user intervention. At the end of the brewing process, the liquids that may have remained inside the brewing chamber (2) move such that they diverge from the inlet opening (4) by the virtue of the above-mentioned sloped structure/structures. By this, when another brewing process is initiated and the base (21) moves to the intake position, the liquids that may have remained inside the brewing chamber (2) do not contact the inlet opening (4).

What is claimed is:

1. A hot beverage preparing device, wherein materials to be used are prevented from being affected by a water vapor formed during a brewing process, or by a residual water inside at least one brewing chamber, comprising the at least one brewing chamber configured for the materials required for preparing a hot beverage to be put inside the at least one brewing chamber, wherein the at least one brewing chamber comprises at least one base movable in upwards and downwards directions, the at least one base comprises: at least one intake position configured for the materials to be taken inside the at least one brewing chamber, at least one brewing position configured for carrying out the brewing process, and at least one discharge position configured for a brewed beverage to be discharged, and the at least one base is movable between the at least one intake, the at least one brewing position and the at least one discharge position, at least one discharge opening for discharging the materials from an inside of the at least one brewing chamber, wherein the at least one discharge opening provides a passage between the inside of the at least one brewing chamber and an outside of the at least one brewing chamber, at least one inlet opening for taking at least one material in a powder form or a granular form, required for preparing the hot beverage, inside of the at least one brewing chamber, and the at least one inlet opening is located below the at least one brewing position of the at least one base.

2. The hot beverage preparing device according to claim 1, wherein the at least one discharge opening is located opposite to the at least one inlet opening.

3. The hot beverage preparing device according to claim 1, wherein the at least one brewing chamber and/or the at least one base is sloped with respect to a ground plane to guide the materials inside the at least one brewing chamber towards a side having the at least one discharge opening.

4. The hot beverage preparing device according to claim 3, wherein a surface normal of the at least one base has an angle with respect to an axial line, and a center of the at least one brewing chamber resides on the axial line.

5. The hot beverage preparing device according to claim 4, the wherein a part of the at least one base closer to the at least one inlet opening is thicker than a part of the at least one base closer to the at least one discharge opening.

6. The hot beverage preparing device according to claim 4, wherein the at least one base is sloped with respect to the ground plane.

7. The hot beverage preparing device according to claim 4, wherein the at least one base comprises a heater, wherein a part of the heater closer to the at least one inlet opening is thicker than a part of the heater closer to the at least one discharge opening.

* * * * *